United States Patent [19]
Fujioka

[11] Patent Number: 5,259,873
[45] Date of Patent: Nov. 9, 1993

[54] HOT MELT INK USED FOR INK JET PRINTER

[75] Inventor: Masaya Fujioka, Nagoya, Japan

[73] Assignee: Brother Kogyo Kabushiki Kaisha, Nagoya, Japan

[21] Appl. No.: 864,350

[22] Filed: Apr. 6, 1992

[30] Foreign Application Priority Data

May 16, 1991 [JP] Japan .................. 3-111699

[51] Int. Cl.⁵ .................................. C09D 11/02
[52] U.S. Cl. ................... 106/20 C; 106/23 C; 106/23 A; 106/31 R; 106/32
[58] Field of Search ............ 106/23 C, 23 A, 22 A, 106/20 C, 31 R, 32

[56] References Cited

U.S. PATENT DOCUMENTS

| | | | |
|---|---|---|---|
| 3,993,492 | 11/1976 | Woolly | 106/23 C |
| 4,066,810 | 1/1978 | Kosaka et al. | 106/20 C |
| 4,365,035 | 12/1982 | Zabiak | 106/23 C |
| 4,390,369 | 6/1983 | Merritt et al. | 106/31 |
| 4,427,810 | 1/1984 | Chisvette et al. | 106/20 C |
| 4,522,654 | 6/1985 | Chisvette et al. | 106/20 C |
| 4,565,576 | 1/1986 | Salgó et al. | 106/23 C |
| 4,659,383 | 4/1987 | Lin et al. | 106/27 |
| 4,742,002 | 2/1988 | Shibata et al. | 106/23 A |
| 5,008,152 | 4/1991 | Mikamo et al. | 106/31 R |
| 5,026,427 | 6/1991 | Mitchell et al. | 106/20 D |
| 5,053,079 | 10/1991 | Haxell et al. | 106/31 R |

FOREIGN PATENT DOCUMENTS 59-22973 2/1984 Japan.

*Primary Examiner*—Helene Klemanski
*Attorney, Agent, or Firm*—Oliff & Berridge

[57] ABSTRACT

In a hot melt ink of the present invention, a paraffin wax and an ethylene-vinyl acetate copolymer are heated and melted, and a carbon black is added therein and is dispersed with its diameter of substantially 1–30 μm. In a dot printed with this hot melt ink, the area of the recorded dot is smaller than the area of the printed dot, and it is possible to print the dot in a high density. Therefore, the hot melt ink of the present invention excels in a color fastness to heat, a color fastness to light, and a color permanence, and a dot image having higher density can be printed.

18 Claims, 5 Drawing Sheets

PRINT PITCH OR PAPER FEEDING WIDTH

DIAMETER OF PRINTED DOT

HOT MELT INK USED FOR INK JET PRINTER

BACKGROUND OF THE INVENTION

1. Field of the Invention

The present invention relates to hot melt ink used for an ink jet printer, and more particularly, to hot melt ink which is solid at room temperature, and melts at high temperature for making a print image at the time of printing.

2. Description of Related Art

An ink jet printer is conventionally proposed for recording desired characters and images on a recording medium such as paper by directly placing an ink droplet jetted from a print head. This ink jet printer has a lot of advantages in the print techniques such as no noise, a high-speed print, a high-quality print, and a color print. However, in the above ink jet printer, the jetted ink droplet is directly placed on the recording paper, so that a print quality or time for drying a printed image are changed according to the kind of the recording paper. That is, there is a problem that the print quality is remarkably deteriorated when it is printed on low quality recording paper, the printed image being blurred and illegible.

In order to solve such a problem, it has been proposed to use ink of a hot melt type as ink for the ink jet printer. The ink of the hot melt type has a melting point higher than the room temperature. It is well-known that a print image could be printed on all kinds of recording paper with the above ink, because the ink becomes solid with a uniform dot diameter on all kinds of recording paper. Various compositions are known for such hot melt ink. For instance, one hot melt ink which contains natural wax is disclosed in U.S. Pat. No. 4,390,369. Further, another hot melt ink which contains stearin acid is disclosed in Japanese Laid-Open Patent Publication No. 59-22973. A third hot melt ink which contains acid of $C_{20}$–$C_{24}$, alcohol of $C_{20}$–$C_{24}$, or ketone whose melting point is 65°–120° C. are disclosed in U.S. Pat. No. 4,659,383. In the above mentioned ink, a dye is used as a color material. Moreover, a forth hot melt ink is disclosed in U.S. Pat. No. 4,659,383. In such an ink, the solid pigment as a color material is dispersed in one of wax, fatty acid of $C_{18}$–$C_{24}$, or alcohol of $C_{18}$–$C_{24}$. The wax, fatty acid, and alcohol have melting points which are higher than 65° C. respectively.

However, as mentioned above, the hot melt ink using the dye as the color material is not always superior in its dye solubility. Thus, there is a problem in that the kind of dye to be used is limited. Further, the hot melt ink does not have a characteristic which is always steady during heating for a long period of time or during the repetition of heating and cooling. Also, there is a problem in color fastness to light. Moreover, in the conventional hot melt ink using the dye or the solid pigment as the color material, there is a problem that the size of a recorded dot formed by an ink droplet on a recording paper is decided by an ink characteristic and a device characteristic, so that there are limitations to increases in the density of the recorded dot. The ink characteristic is a characteristic such as the viscosity and the surface tension of ink, and the device characteristic is a characteristic such as the jet nozzle diameter, the jet power, and the jet temperature of the ink jet device.

SUMMARY OF THE INVENTION

An object of the present invention is to provide a hot melt ink for an ink jet printer capable of printing an image of high density, and which is excellent in stability, in color fastness to light, and in color permanence of ink at high temperature.

In order to achieve this object, hot melt ink for an ink jet printer of the present invention which forms printed dots as ink changes from a solid ink form to a liquid ink form by being heated and melted comprises: a vehicle which is solid at room temperature and is liquid at ink jet temperature, and a pigment whose particle diameter is substantially 1–30 μm (micro-meter), the pigment accumulating at the center of a printed dot as the vehicle is cooled and solidified.

In the hot melt ink of the present invention thus constructed, the vehicle is a dispersion medium of the pigment and is solid at room temperature, and is melted by thermal energy, becoming a liquid having a viscosity which can be jetted at temperatures above the melting point of the ink. On the recording paper immediately after printing, the vehicle is gradually cooled and solidified toward a center part from an outer part of the printed dot. The vehicle holds the pigment, and adheres hot melt ink to a recording paper. The pigment which is crushed and mixed in the vehicle, having the diameter of substantially 1–30 μm, accumulates toward the center part of the printed dot according to the cooling and solidifying of the vehicle toward the center part from the outer part, on the recording paper immediately after printing. A colored part, namely a recorded part, which is smaller than the outer part of the printed dot is produced thereon.

According to the hot melt ink for the ink jet printer of the present invention, the pigment is used as a color material, so that an image printed by the present ink jet printer excels in color fastness to heat, in color fastness to light, and in color permanence. Further, the recorded dot becomes smaller than the printed dot, so that the density of the recorded dot can be increased. Thus, the manufacture of the ink jet device can be facilitated.

BRIEF DESCRIPTION OF THE DRAWINGS

A preferred embodiment of the present invention will be described in detail with reference to the following figures wherein.

DETAILED DESCRIPTION OF THE PREFERRED EMBODIMENT

Hereafter, a preferred embodiment of the present invention will be described with reference to the drawings.

At first, a composition of hot melt ink of this embodiment will be explained. A vehicle used for the hot melt ink of the present embodiment is a solvent such as paraffin wax (trade name HNP-10 made by Nippon Seiro Co., Ltd., having a melting point of 76° C.) and the pigment is carbon black, for example. Moreover, an adhesive of ethylene-vinyl acetate copolymer (trade name EVA210 made by Mitsui-Dupont Polychemicals Co., Ltd.) is added to the hot melt ink for increasing its tacky force to the recording paper. The paraffin wax has a block shape before melting. Ethylene-vinyl acetate copolymer is an elastic particle whose diameter is 3-5 millimeters before melting. The composition of the hot melt ink of the present embodiment is as follows.

Paraffin wax (HNP-10)—90 wt %
Ethylene-vinyl acetate copolymer (EVA210)—5 wt %
Carbon black—5 wt %

Next, the manufacturing method of the hot melt ink of the preferred embodiment is explained with reference to FIGS. 3A through 3F.

Figure 3A:
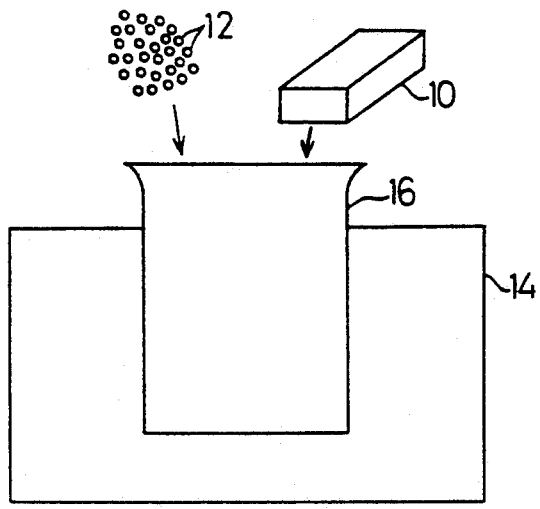
FIGS. 3A through 3F are schematic illustrations showing a manufacturing method of hot melt ink of the present invention.
Figure 3B:
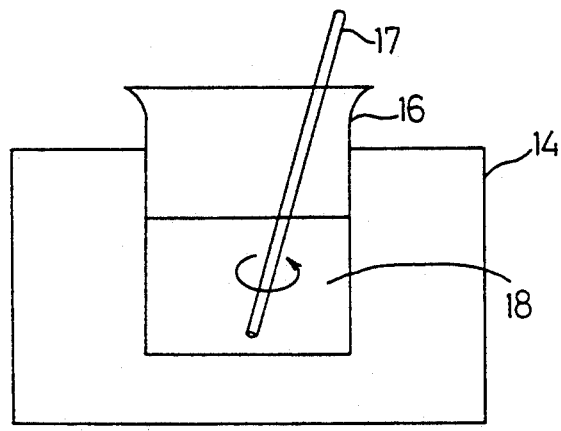

The vehicle mixed liquid making process is initially performed as shown in FIGS. 3A and 3B. First, as shown in FIG. 3A, paraffin wax 10 and ethylene-vinyl acetate copolymer 12 are put in a container 16 being kept at 120° C. in a temperature controlled test tank 14. The paraffin wax solvent 10 and the ethylene-vinyl acetate copolymer adhesive 12 are then heated and melted, so that mixed liquid 18 is made as shown in FIG. 3B. The resulting vehicle is solid at room temperature and liquid at an ink jet temperature higher than room temperature. At this time, a preferable heating temperature is 100°-150° C., more preferably 120°-130° C.

Figure 3C:
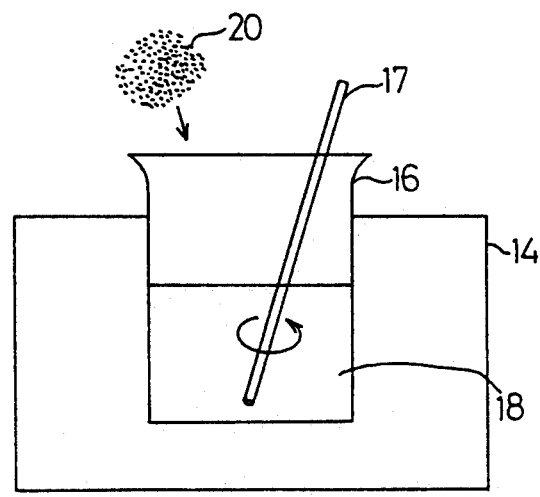

The pigment adding process is then performed as shown in FIG. 3C. In this process, carbon black 20 which is particle type pigment is added to the mixed liquid 18 made by the above vehicle mixed liquid making process. At this time, the carbon black 20 is added to the mixed liquid 18 by stirring by a stir stick 17.

Figure 3D:
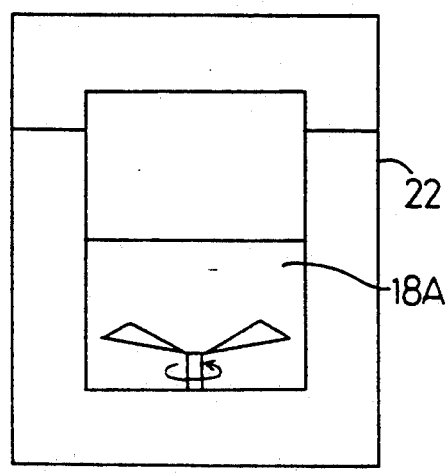

The pigment crushing process is then performed as shown in FIG. 3D. In this process, the mixed liquid 18A to which the carbon black 20 is added by the above-mentioned process is initially poured into crushing devices 22 such as ATTRITOR (made by the Tsubakimoto Chain Co.) and roll mill. The carbon black 20 is crushed and is dispersed therein. At this time, the paraffin wax 10 which is the dispersion medium does not have a polar group, so that the carbon black 20 having polarity on its surface cannot be dispersed perfectly, i.e., the dispersed condition thereof becomes imperfect. In other words, since the paraffin wax 10 and the carbon black 20 do not have sufficient affinity, the carbon black 20 cannot disperse perfectly as fine particles. The imperfectly dispersed condition indicates a condition where the pigment such as the carbon black 20 is dispersed with the particle diameter between substantially 1 $\mu$m and 30 $\mu$m. When this imperfectly dispersed condition is realized, an accumulation effect of the pigment toward the center of printed dot which will be described later is generated. This accumulation effect is the most important point of the present invention. The pigment of conventional hot melt ink has a diameter of 0.01 $\mu$m to 0.20 $\mu$m. If the particle diameter of the pigment is less than substantially 1 $\mu$m, that is, it is in a perfectly dispersed condition, the accumulation of the pigment toward the center of the printed dot does not happen easily. Therefore, as the conventional hot melt ink, the dispersion of the pigment in the whole printed dot creates a problem. In addition, if the particle diameter of the pigment is larger than substantially 30 $\mu$m, a problem occurs in that the pigment is clogged in the jet nozzle which is the ink jet part when the ink is jetted, or the pigment precipitates in the ink before being jetted. In case of this embodiment, the average particle diameter of the carbon black 20 is about 5 $\mu$m.

The hot melt ink of this embodiment can be completed by the above process, and it can be actually used. However, it is necessary to cool and to solidify the liquid hot melt ink in order to both produce and commercialize the ink. The following caking processes are then performed.

Figure 3E:
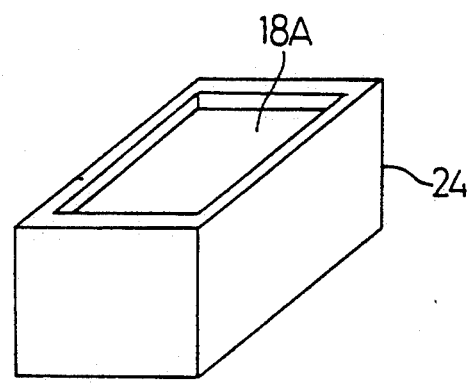

The caking process is performed as shown in FIG. 3E. In this process, the mixed liquid 18A in which the carbon black 20 is crushed in the above-mentioned pigment crushing process, is cooled and solidified. First, as shown in FIG. 3E, the mixed liquid 18A, in which the carbon black 20 is crushed about 5 $\mu$m by the crushing device 22, is poured into a mold 24 and is left until the mixed liquid 18A solidifies. The mixed liquid 18A is then cooled to room temperature and is solidified.

Figure 3F:
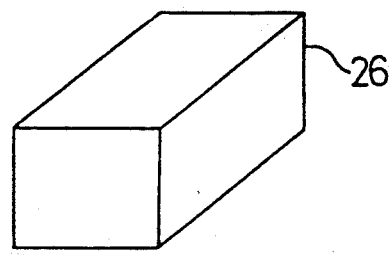

The mold removing process is performed lastly as shown in FIG. 3F. In this process, the mixed liquid 18A is removed from the mold 24 as shown in FIG. 3F after it is solidified. The solidified mixed liquid 18A is the finished hot melt ink 26. Thus, the hot melt ink 26 of this embodiment is completed as a product.

There will be various manufacturing methods for producing the hot melt ink other than the above described method. The most important point of the hot melt ink is that, as described above, the pigment is dispersed to the vehicle in imperfect condition, the pigment having a particle diameter of substantially 1-30 $\mu$m.

Figure 1B:
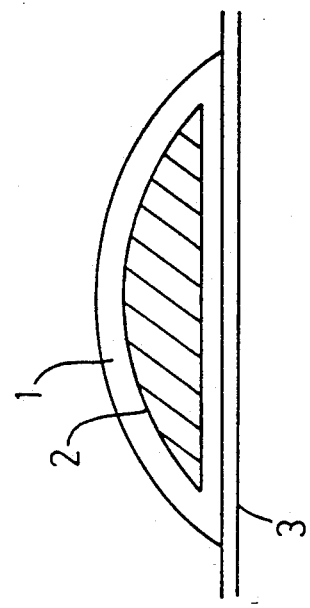
FIG. 1B is a side elevation view of a dot printed on a recording paper by using hot melt ink of the present invention.
Figure 1A:
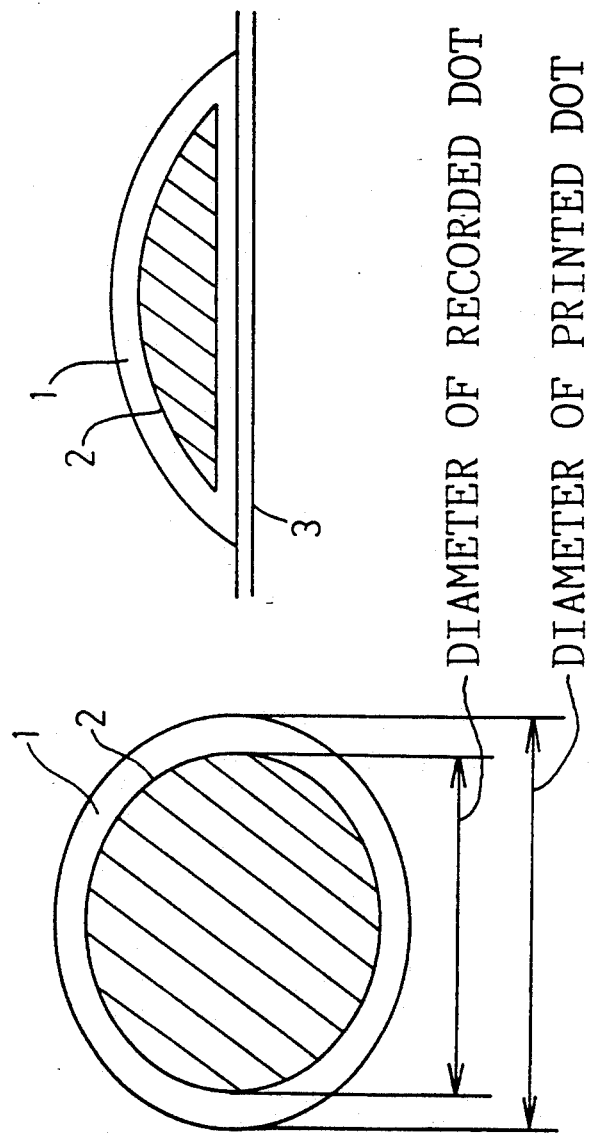
FIG. 1A is a top plan view of a dot printed on a recording paper by using hot melt ink of the present invention.
Figure 2A:
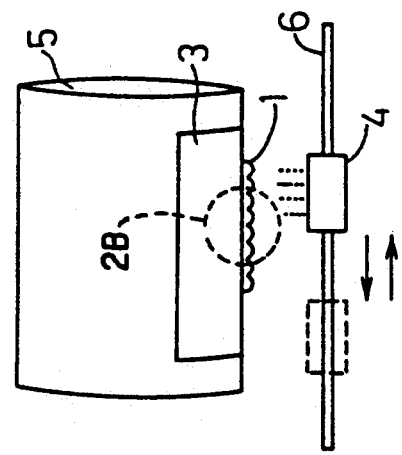
FIGS. 2A and 2B are views illustrating a relation between a print pitch and a print dot diameter.
Figure 2B:
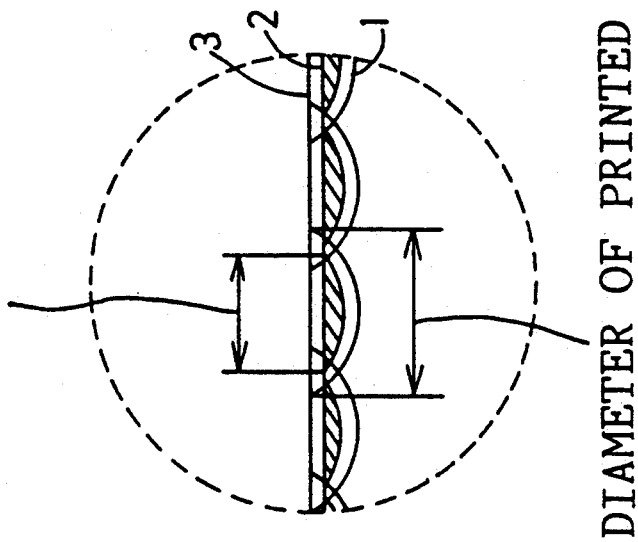

Next, the operation of the hot melt ink produced by this embodiment will be explained with reference to FIGS. 1A and 1B and FIGS. 2A and 2B. FIG. 1A is a top plan view of a dot printed on a recording paper by using hot melt ink of the present invention. FIG. 1B is a side elevation view of a dot printed on a recording paper by using hot melt ink of the present invention. FIGS. 2A and 2B are views illustrating a relation between a print pitch and a print dot diameter.

A printed dot 1 as shown in FIG. 1 is formed on a recording paper 3 when printing is performed on the recording paper 3 by the well-known ink jet device using the hot melt ink 26 produced by the manufacturing method described above. If the average particle diameter of the carbon black 26 is less than substantially 1 $\mu$m, or more than substantially 30 $\mu$m, the print dot is formed on the recording paper without the accumulation effect. In the hot melt ink 26 of this embodiment, the average particle diameter of carbon black 26 is about 5 $\mu$m. Therefore, when the printed dot 1 is recorded on the recording paper 3, the printed dot 1 is cooled and solidified sequentially from the outer surface to the center as described above. Accordingly, the carbon black 26 accumulates at the center of the printed dot 1. As clearly shown in FIGS. 1A and 1B, the vehicle is translucent white, so that the part which actually functions as a recorded pixel is a recorded dot 2 which is the agglomerated part of the carbon black 26. Therefore, the recorded dot 2 becomes smaller than the printed dot 1, so that it is possible to increase the record density as compared with the conventional hot melt ink in which the printed dot and the recorded dot are of equal size.

When the printing operation is actually performed, as shown in FIGS. 2A and 2B, a print pitch of a print head 4 supported movably by a shaft 6 or a paper feeding width of the recording paper 3 supported on a platen 5 are adjusted not to the diameter of the printed dot 1 but to the diameter of the recorded dot 2, so that the printed image having a high density is obtained. In case of this embodiment, it is clear that the area of the recorded dot 2 occupies about 85 percent of the area of the printed dot 1. However, this area percentage can be changed by a dispersion method, print condition, and quality of paper.

If the area percentage of the recorded dot 2 is 85 percent, the record density becomes 1.18 times higher than the record density when the area percentage is 100 percent. Accordingly, if the hot melt ink 26 having the composition described in this embodiment is used in the ink jet device which can print an image with the record density of 300 dpi (dot per inch), it is possible to obtain a printed image having a high density, such as the record density of about 350 dpi.

Moreover, it is also possible to enlarge the diameter of the jet nozzle of the ink jet device without decreasing the record density. If the diameter of the jet nozzle becomes large, manufacturing of the nozzle plate becomes easy, thereby reducing a manufacturing cost. Thus, the ink jet device can be manufactured easily and at a low price.

TABLE 1

|              | EX.1    | EX.2    | EX.3    | EX.4    | EX.5    |
|--------------|---------|---------|---------|---------|---------|
| HNP-10       | 90 wt % |         |         |         |         |
| HNP-9        |         | 90 wt % |         |         |         |
| 155          |         |         | 90 wt % |         |         |
| HI-MIC-1070  |         |         |         | 90 wt % |         |
| HI-MIC-2065  |         |         |         |         | 90 wt % |
| EVA210       | 5 wt %  | 5 wt %  | 5 wt %  | 5 wt %  | 5 wt %  |
| CARBON BLACK | 5 wt %  | 5 wt %  | 5 wt %  | 5 wt %  | 5 wt %  |

In Table 1, some other ink compositions which can achieve the accumulation effect of the carbon black to the center of the printed dot are shown. As shown in Table 1, in some ink compositions for the present invention, solvents such as the other paraffin waxes (trade names HNP-9 and 155, made by Nippon Seiro Co., Ltd.) and the microcrystalline waxes (trade names HI-MIC-1070 and HI-MIC-2065, made by Nippon Seiro Co., Ltd.) can be used as the saturated hydrocarbon of the vehicle.

Moreover, it is possible to mix and use more than two kinds of waxes as the solvent. Further, it is possible to use saturated hydrocarbon waxes other than the waxes indicated in Table 1. Waxes used as the saturated hydrocarbon wax are only the paraffin wax and the microcrystalline wax. Therefore, it is possible to use other waxes having different molecular weight distribution, or different average molecular weight in these two waxes. Moreover, it is possible to obtain the accumulation effect as mentioned above, by adjusting the combination with the pigment, even if a wax other than the saturated hydrocarbon wax is used. Moreover, it is possible to obtain the same effect as the present invention, even if other organic pigments and inorganic pigments are used not limited to the carbon black. As one example of the organic pigments, there are a phthalocyanine pigment, a quinacridone pigment, a monoazo pigment, a disazo pigment. As one example of the inorganic pigments, there is titanium oxide.

According to the hot melt ink for the ink jet printer of the present invention, the pigment is used as a color material, so that an image printed by the present ink jet printer excels in color fastness to heat, color fastness to light, and color permanence. Further, as the recorded dot becomes smaller than the printed dot, the density of the recorded dot can be increased. Furthermore, the manufacture of the ink jet device can be facilitated.

It is to be understood that the present invention is not restricted to the particular forms shown in the foregoing embodiment, and various modifications and alterations can be added thereto without departing from the scope of the inventions encompassed by the appended claims.

Figure 4:
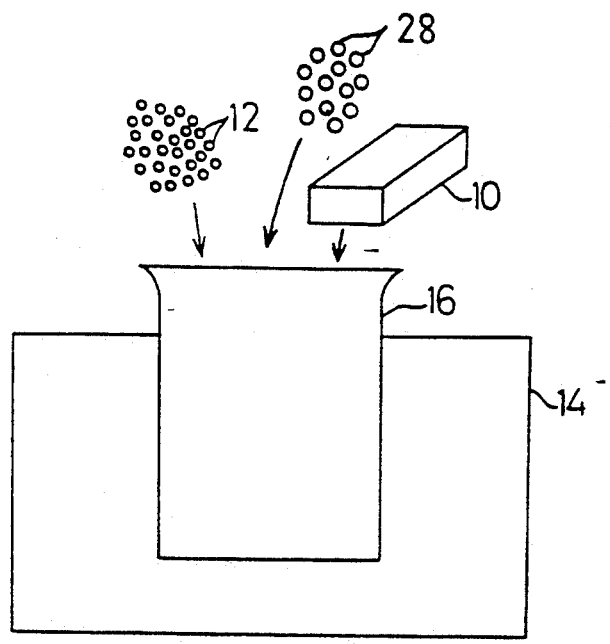
FIG. 4 is a schematic illustration showing a manufacturing method of hot melt ink containing an additive.

For instance, the hot melt ink of the present invention can contain various additives 28 as illustrated in FIG. 4. For instance, a dispersion adjustor for controlling a dispersion of pigment, a viscosity adjustor for adjusting a melting viscosity of ink, a melting point adjustor for adjusting an ink melting point, and a tackifier for improving bonding power between the ink and the recording paper can be included. The dispersion adjustor is for adjusting the particle diameter to be smaller, and contains waxes of acid and alcohol which have radicals except the hydrocarbon, and the maleic anhydride copolymer etc. which has polarities. As the viscosity adjustor EEA (ethylene-ethyl acrylate copolymer) can be used. The amount of ethylene-vinyl acetate copolymer (EVA210) can be changed in the embodiment mentioned above. As the melting point adjustor, other paraffin waxes whose melting points are different can be used. As the tackifier, a petroleum resin such as a rosin resin, a ketone resin, a polyamide resin and a phenolic resin can be used.

What is claimed is:

1. A hot melt ink for an ink jet printer for forming a print dot with a liquid ink made by heating and melting a solid ink, comprising:
    a vehicle which is solid at a room temperature and which is liquid at an ink jet temperature higher than the room temperature, said vehicle comprising a saturated hydrocarbon compound; and
    a pigment having a particle diameter of 1-30 μm, said pigment agglomerating at a center of the print dot as the vehicle cools and solidifies.

2. The hot melt ink as claimed in claim 1, wherein said vehicle comprises a paraffin wax.

3. The hot melt ink as claimed in claim 1, wherein said vehicle comprises a microcrystalline wax.

4. The hot melt ink as claimed in claim 1, wherein said pigment comprises an organic pigment.

5. The hot melt ink as claimed in claim 1, wherein said pigment comprises an inorganic pigment.

6. The hot melt ink as claimed in claim 1, wherein said pigment comprises a carbon black.

7. The hot melt ink as claimed in claim 1, further comprising at least one additive selected from a group consisting of a dispersion adjustor, a viscosity adjustor, a melting point adjustor, and a tackifier.

8. A method of manufacturing a hot melt ink, comprising the steps of:
    heating a solvent and an adhesive to make a mixed solution thereof, said mixed solution comprising a saturated hydrocarbon compound;
    adding a pigment to said mixed solution; and
    crushing said pigment into particles which each have a diameter of 1-30 μm to disperse the particles in said mixed solution.

9. The method as claimed in claim 8, further comprising a step of solidifying said mixed solution in which said pigment is dispersed.

10. The method as claimed in claim 9, wherein said step of solidifying said mixed solution comprises a step of pouring said mixed solution into a mold.

11. The method as claimed in claim 9, further comprising a step of removing from the mold said solidified mixed solution which has been poured into said mold to form said hot melt ink.

12. The method as claimed in claim 8, wherein said step of heating includes using as said solvent one of a paraffin wax and a microcrystalline wax.

13. The method as claimed in claim 8, wherein said step of heating includes using as said adhesive an ethylene-vinyl acetate copolymer.

14. The method as claimed in claim 8, wherein said step of adding includes adding a carbon black as said pigment.

15. The method as claimed in claim 8, wherein said step of heating to make a mixed solution includes heating the solvent and the adhesive to form a vehicle which is solid at a room temperature and which is liquid at an ink jet temperature higher than the room temperature.

16. The method as claimed in claim 8, wherein said step of adding the pigment includes adding an organic pigment.

17. The method as claimed in claim 8, wherein said step of adding the pigment includes adding an inorganic pigment.

18. The method as claimed in claim 8, further comprising the step of adding an additive selected from a group consisting of a dispersion adjustor, a viscosity adjustor, a melting point adjustor and a tackifier.

* * * * *